No. 626,591. Patented June 6, 1899.
C. D. CANNON.
VEHICLE WHEEL.
(Application filed July 30, 1898.)
(No Model.)
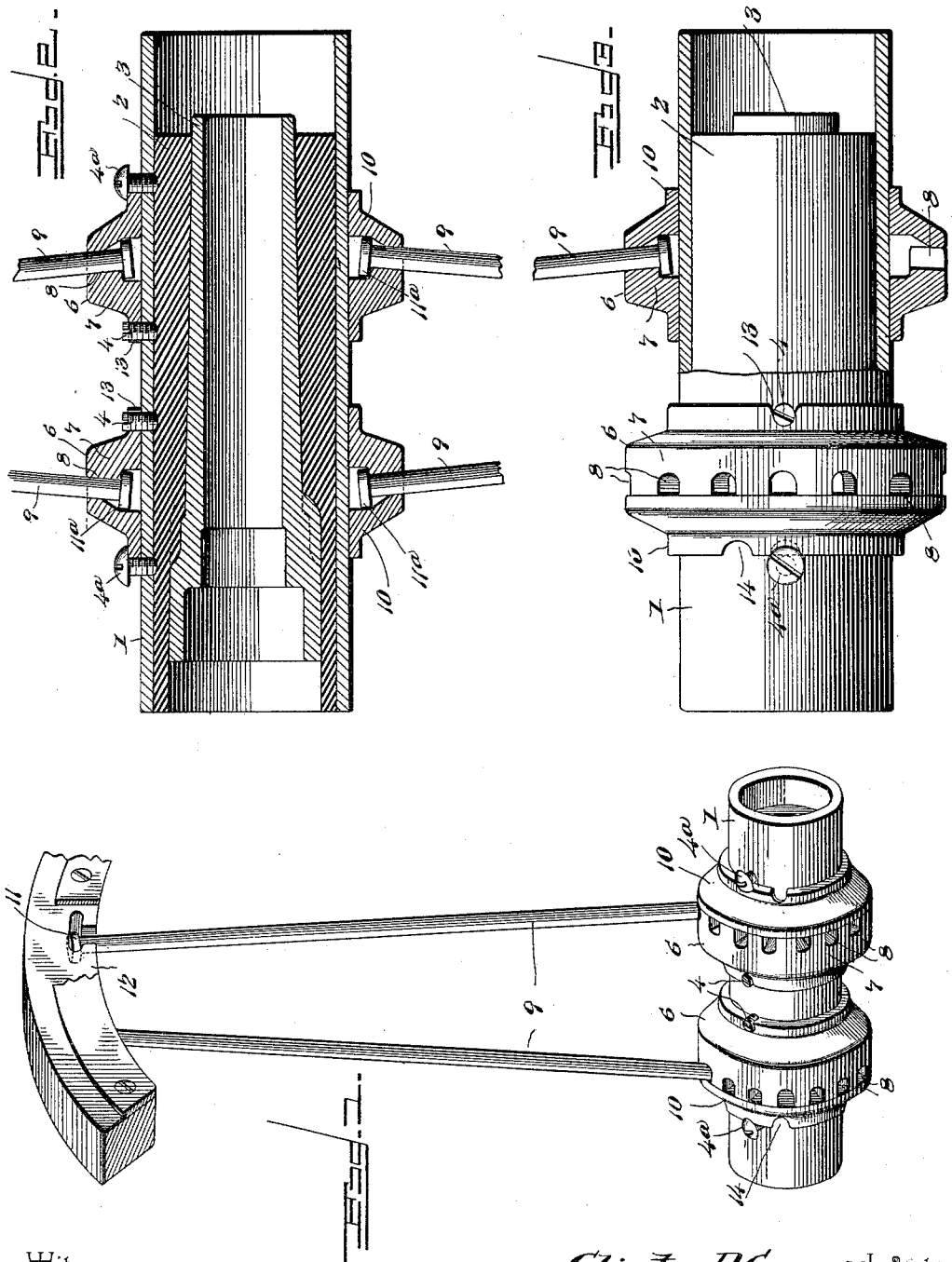

UNITED STATES PATENT OFFICE.

CLINTON D. CANNON, OF BATTLE CREEK, MICHIGAN.

VEHICLE-WHEEL.

SPECIFICATION forming part of Letters Patent No. 626,591, dated June 6, 1899.

Application filed July 30, 1898. Serial No. 687,281. (No model.)

*To all whom it may concern:*

Be it known that I, CLINTON D. CANNON, a citizen of the United States, residing at Battle Creek, in the county of Calhoun and State of Michigan, have invented a new and useful Vehicle-Wheel, of which the following is a specification.

My invention relates to vehicle-wheels, and has for its object to provide such a construction of wheel as to adapt it for metallic non-adjustable spokes, which are similarly headed at both ends and which may be terminally reversible.

A further object of the invention is to provide an improved wheel-hub of such construction as to allow for the varying of the spread of the spokes or the interval between the inner or hub ends thereof and for varying the strain upon or tension of the spokes, and, furthermore, to provide means whereby the adjustment of the sleeve or shell of the hub may be varied with relation to the axle-box to afford more or less projection of the sleeve or shell beyond the outer end of said axle-box.

A further object of the invention is to provide a suspension-hub, wherein the desired tension of the spokes may be attained without the use of independent adjusting devices for each spoke.

Further objects and advantages of this invention will appear in the following description, and the novel features thereof will be particularly pointed out in the appended claims.

In the drawings, Figure 1 is a perspective view of a portion of a wheel constructed in accordance with my invention. Fig. 2 is a sectional view of the same, taken parallel with the axis of the hub. Fig. 3 is a plan view, partly broken away, of the hub.

Similar numerals of reference indicate corresponding parts in all the figures of the drawings.

The hub of the wheel embodying my invention includes a tubular exteriorly-cylindrical or diametrically-uniform sleeve or shell 1, within which is adjustably fitted a core 2, of yielding or elastic material—such as rubber, wood, or the equivalent thereof—having a cylindrical exterior surface to fit in the bore of the sleeve or shell and a tapered bore to receive the axle-box 3, which may be of the ordinary or any preferred construction. The snug fitting of the axle-box in the core serves to expand the latter, and thus fasten at the desired relative adjustment the sleeve, core, and box; but in addition to this I preferably employ set-screws 4, threaded in openings in the sleeve or shell and extending through the same to impinge upon the core, and thereby not only secure the latter more firmly in place, but exert pressure upon the box to lock it in place.

Fitted for axial adjustment upon the exterior surface of the sleeve or shell are two independent collars 6, each of which is of sectional construction and comprises a body portion 7, in which is formed a plurality of spoke seats or notches 8, open at their outer sides to receive the shanks or body portions of the spokes 9, and a holding or clamping ring or cap 10 to close the spoke-seats of the body portion of the collar. These collars are adjustable axially upon the cylindrical exterior surface of the sleeve or shell to provide for the spreading of the inner or hub ends of the spokes 9, of which the outer ends are headed, as shown at 11, and are positively or nonadjustably seated in the rim 12, and the inner ends of the spokes, which are headed, as shown at 11$^a$, are held from displacement from the seats of the collars by means of the said cap-rings, which are adapted to be adjusted or moved relatively to the body portions of the collars to release the inner ends of the spokes. The means illustrated in the drawings for securing the collars at the desired interval or at the desired adjustment with relation to the sleeve or shell consist of a suitable number of the above-mentioned set-screws 4, which are fitted in threaded openings drilled in the sleeve or shell at the desired points to maintain the collars as adjusted, other openings being adapted to be formed, if required, to arrange the collars in different relative positions. Preferably the inner flanges of the collars are provided with notches 13 in registration with the openings in the sleeve or shell for engagement by said set-screws, whereby rotary displacement of the body portions of the collars is prevented. The cap-rings are similarly held in place to close the open sides of the spoke-seats by means of other set-screws 4$^a$; but preferably the intervals between the set-screws 4 and 4ᵃ are such that when the inner surfaces of the cap-rings are in contact with the outer surfaces of the body portions of the collars the outer edges of said cap-rings bear against the set-screws 4ᵃ; but the said outer edges of the cap-rings are notched or cut away at the proper intervals, as shown at 14, and when these notches or cut-away portions are in registration with the set-screws 4ᵃ the cap-rings are free to move outwardly or axially upon the sleeve or shell to remove them from their operative position with relation to the spoke-seats, and thus allow the displacement of the inner ends of the spokes to replace any which may have been injured or broken. Therefore after the desired adjustment of the body portions of the collars has been secured, to obtain the desired tension upon the spokes (which under ordinary circumstances retain their positions in engagement with the spoke-seats by reason of their elasticity) it is only necessary to press the cap-rings inwardly to close the spoke-seats and then turn said rings sufficiently to throw their notches out of registration with the outer set-screws 4ᵃ in order to insure the maintenance of the hub ends of the spokes in their operative positions.

To change the adjustment of the core and axle-box to provide a greater or less projection of the sleeve or shell beyond the outer ends of said core and box, it is simply necessary to loosen the set-screws and advance the core and box together in the desired direction with relation to the sleeve or shell and subsequently tightening the set-screws to lock the parts in the desired relative positions.

The contiguous surfaces of the body portions of the collars and the cap-rings by which the spoke-seats are closed are undercut to form an annular cavity to receive the heads at the inner or hub ends of the spokes, and it is obvious that as each spoke is headed similarly at both ends and may be made of uniform diameter throughout the spokes are terminally reversible, and therefore that the construction of a wheel in accordance with my invention is simplified and the operation of assembling the parts of the wheel is correspondingly facilitated.

Various changes in the form, proportion, and the minor details of construction may be resorted to without departing from the spirit or sacrificing any of the advantages of this invention.

Having described my invention, what I claim is—

1. A wheel having a rim and spokes, a hub having an exteriorly-cylindrical sleeve or shell, independent collars fitted upon the sleeve or shell for relative axial adjustment and provided with spoke-seats for the headed inner ends of the spokes, and set-screws threaded in the said hub sleeve or shell at the outer and inner sides of each collar, substantially as specified.

2. A wheel having a rim and spokes, a hub having a sleeve or shell, collars fitted upon the sleeve or shell, and each comprising a body portion having open-sided spoke-seats for the reception of the headed inner ends of the spokes, and a cap-ring fitted upon said sleeve or shell for axial and rotary adjustment, to close the open sides of said seats, and pins arranged in the paths of outward movement of said cap-rings for holding the latter in position to close the seats, said cap-rings being cut away or notched to register with said pins, and allow axial movement of the cap-rings to open the spoke-seats, substantially as specified.

3. A wheel having a rim and spokes, a hub having an exteriorly-cylindrical sleeve or shell, independent collars fitted upon the sleeve or shell for relative adjustment, and each comprising a body portion having open-sided spoke-seats for the reception of the inner headed ends of the spokes, and a cap-ring fitted upon said sleeve or shell for axial and rotary adjustment, and adapted to close the open sides of said seats, means for securing the body portions of said collars at the desired relative adjustment upon the sleeve or shell, and pins arranged in the paths of outward movement of said cap-rings for holding the latter in position to close the spoke-seats, said cap-rings being cut away or notched to register with said pins to allow axial movement of the cap-rings to open the spoke-seats, substantially as specified.

4. A wheel having a hub including a sleeve or shell, and means for attaching the inner ends of spokes thereto, a diametrically-yielding core fitted within the sleeve or shell for axial adjustment, an axle-box arranged within said core, and set-screws fitted in the sleeve or shell for locking the core at the desired axial adjustment, substantially as specified.

5. A wheel having an interiorly-cylindical sleeve or shell provided with exterior means for engaging the inner ends of spokes, a diametrically-yielding compressible core fitted for axial adjustment in the bore of the sleeve or shell, an axle-box seated in the core, and set-screws threaded in the sleeve or shell and impinging against the exterior surface of said core for locking the latter and the axle-box at the desired adjustment with relation to the sleeve or shell, substantially as specified.

6. A wheel having an exteriorly and interiorly cylindrical sleeve or shell, collars mounted exteriorly upon the shell for axial adjustment and provided with means for engaging spokes, set-screws for securing said collars at the desired axial adjustment, a yielding core fitted for axial adjustment in the sleeve or shell and adapted to be engaged and secured at the desired adjustment by said set-screws, and an axle-box seated in the core, substantially as specified.

7. A wheel having an exteriorly and interiorly cylindrical sleeve or shell, independent collars fitted for relative axial adjustment upon the exterior surface of the sleeve or shell and provided with sets of spoke-seats for the reception of the inner ends of spokes, set-screws threaded in the sleeve or shell at the outer and inner edges of said collars for securing the latter at the desired relative adjustment, a yielding core fitted for axial adjustment in the sleeve or shell, and adapted to be engaged and secured at the desired adjustment by said set-screws, and an axle-box seated in the core, substantially as specified.

In testimony that I claim the foregoing as my own I have hereto affixed my signature in the presence of two witnesses.

CLINTON D. CANNON.

Witnesses:
MAURICE E. NEALE,
GEO. F. NEALE.